US008671022B2

(12) United States Patent
Sinn et al.

(10) Patent No.: US 8,671,022 B2
(45) Date of Patent: Mar. 11, 2014

(54) AGGREGATED CONTEXTUAL TARGETING ADVERTISEMENTS USING INSTANT MESSAGING CLIENTS

(75) Inventors: Richard Sinn, Milpitas, CA (US); Takchun Tse, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 164 days.

(21) Appl. No.: 13/039,256

(22) Filed: Mar. 2, 2011

(65) Prior Publication Data
US 2012/0226561 A1    Sep. 6, 2012

(51) Int. Cl.
*G06Q 30/00* (2012.01)

(52) U.S. Cl.
USPC .................. 705/14.66; 705/14.73; 705/14.51; 705/14.49; 705/14.4

(58) Field of Classification Search
USPC .......... 705/14.49, 14.64, 14.66, 14.67, 14.73; 715/808
See application file for complete search history.

(56) References Cited

U.S. PATENT DOCUMENTS

| 5,361,078 | A | * | 11/1994 | Caine | 345/1.3 |
| 6,123,259 | A | * | 9/2000 | Ogasawara | 235/380 |
| 2009/0313116 | A1* | | 12/2009 | Ashbaugh | 705/14.47 |
| 2010/0082755 | A1* | | 4/2010 | Bryan et al. | 709/206 |

OTHER PUBLICATIONS

"Subway Restaurants Break New Advertising Series", Business Wire, Apr. 2, 2004, p. 5490.*
Culbert, "Banner Basics: Create Ads That Work", Site Point, May 29, 2001, found on line at sitepoint.com/basics-create-ads-work.*
"Subway Restaurants Break New Advertising Series", Business Wire, Apr. 2, 2004.*

* cited by examiner

*Primary Examiner* — John G Weiss
*Assistant Examiner* — Scott C Anderson
(74) *Attorney, Agent, or Firm* — Mauriel Kapouytian Woods LLP; James Woods (57) ABSTRACT

A method, apparatus and computer program product for displaying to a user an aggregated contextual targeting advertisement using an instant messaging client having an ad line area within an instant messaging graphical user interface, and an ad pop-up area on the same display surface as the instant messaging graphical user interface. The method commences by receiving a user context profile and then selecting at least one advertisement based on characteristics of the user. The method continues by separating the advertisement into a first portion and a second portion for the purpose of displaying the first portion in an ad line area within an instant messaging graphical user interface, and for displaying the second portion in an ad pop-up area on the same display surface as the instant messaging graphical user interface. Some embodiments separate the first portion and the second portion by automatically selecting strings, and/or by automatically selecting images.

20 Claims, 7 Drawing Sheets

AGGREGATED CONTEXTUAL TARGETING ADVERTISEMENTS USING INSTANT MESSAGING CLIENTS

FIELD OF THE INVENTION

The present invention relates generally to internet advertising, more specifically to targeting advertisements using instant messaging clients.

BACKGROUND OF THE INVENTION

Since the widespread acceptance of the internet, internet advertising has proven to be effective for messaging, and also a lucrative source of revenue. Advertising on the Internet provides the possibility of allowing advertisers to cost-effectively reach highly specific target audiences—as opposed to traditional broadcast and print advertising media that reach only broadly definable target audiences (e.g. radio listeners in the greater Memphis area).

One aspect of internet advertising involves placement of advertising or messages on or in the user interface provided by instant messaging clients (e.g. chat, iChat, Messenger, AIM, ICQ, aMSN, IM, etc). However, conventional placement of advertising or messages on or in the aforementioned user interface has been limited, and woefully lacking in terms of targeting, context, and overall richness.

Accordingly, there exists a need for overcoming the above-mentioned and other limitations in order to facilitate aggregated contextual targeting advertisements using instant messaging clients.

SUMMARY OF THE INVENTION

A method, apparatus and computer program product for displaying to a user an aggregated contextual targeting advertisement using an instant messaging client having an ad line area within an instant messaging graphical user interface, and an ad pop-up area on the same display surface as the instant messaging graphical user interface. The method commences by receiving a user context profile and then selecting at least one advertisement based on characteristics of the user. The method continues by separating the advertisement into a first portion and a second portion for the purpose of displaying the first portion in an ad line area within an instant messaging graphical user interface, and for displaying the second portion in an ad pop-up area on the same display surface as the instant messaging graphical user interface. Some embodiments separate the first portion and the second portion by automatically selecting strings of text, and/or by automatically selecting images.

BRIEF DESCRIPTION OF THE DRAWINGS

The novel features of the invention are set forth in the appended claims. However, for purpose of explanation, several embodiments of the invention are set forth in the following figures:

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an item and/or a message.

"Ad call" means a message sent by a computer to an ad server for requesting an ad to be displayed.

"Ad click-through rate" (e.g. click-through rate) means a measurement of ad clicks per a period of time.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may include one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Impression" (e.g. ad impression) means a delivery of an ad to a user device for viewing by a user.

"Item" means an ad, which is defined above.

"Message" means an ad, which is defined above.

"Messaging" means advertising, which is defined above.

"Network" means a connection, between any two or more computers, that permits the transmission of data. A network may be any combination of networks including, without limitation, the internet, a local area network, a wide area network, a wireless network, and/or a cellular network.

"Publisher" means an entity that publishes, on a network, a web page having content and/or ads, etc.

"Server" means a software application that provides services to other computer programs (and their users) on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from web pages on websites. Examples of a web browser include, without limitation, Mozilla Firefox™ and Microsoft Internet Explorer™

"Web page" means documents written in a mark-up language including, without limitation, HTML (hypertext markup language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected by links or URL addresses to form a coherent group.

Introduction to Advertisements Using Instant Messaging Clients

Users of instant messaging clients have become accustomed to seeing sponsored messages or advertisements on the same display surface as is their instant messaging graphical user interface. For example, a sponsored message might be presented in a text area within a window.

Figure 1:
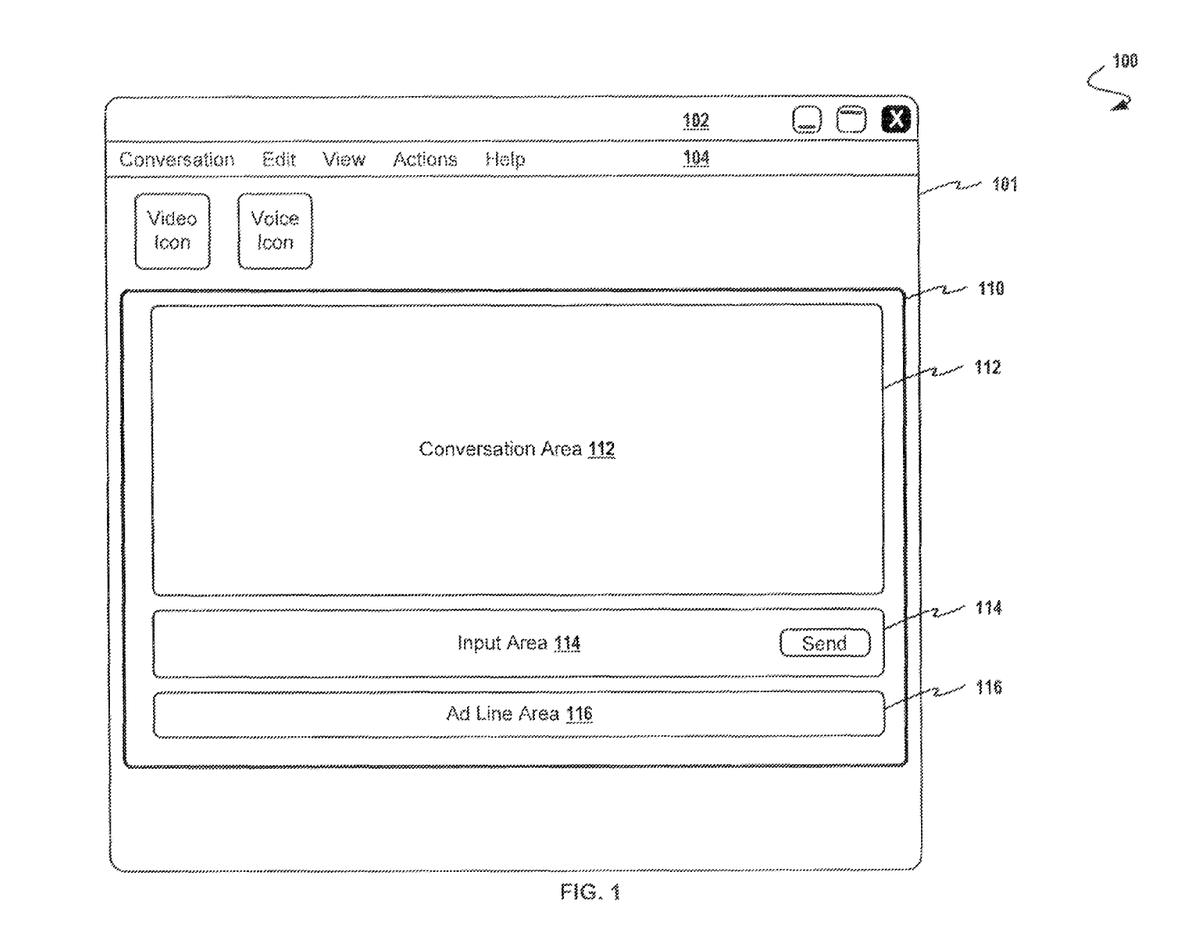
FIG. 1 depicts an instant messaging graphical user interface running on a computing device capable of running an instant messaging client, according to one embodiment.

FIG. 1 depicts an instant messaging graphical user interface 100 running on a computing device capable of running an instant messaging client. As shown, a display area for diplaying one or more instances of a window 101 is rendered by a computing device (not shown). Such a window can provide a user window control bar 102 of a window 101, the control bar including user controls such as minimize, maximize and close. And, such a window can display an application command toolbar 104 for providing application-specific controls. For example, an application command toolbar 104 can comprise commands particular to the operating of an instant messaging client software program (not shown). In some cases, an application command toolbar 104 can include a ribbon, which ribbon can in turn comprise icons (e.g. a video icon, a voice icon, etc) for facilitating user control of the instant messaging client.

In some embodiments, a dedicated screen area 110 is provided for containing a conversation area 112 in which one or more conversations can be rendered as text (e.g. ascii text, rich text, HTML-rendered text, etc). Also, in some embodiments, a dedicated screen area 110 is provided for containing an input area 114 from which the content used in conversation (e.g. ascii text, rich text, HTML-rendered text, etc) can be input and edited by the user prior to insertion into the conversation area 112.

As aforementioned, users have become accustomed to seeing sponsored messages or advertisements on the same display surface, and in some cases messages or advertisements are diplayed in areas on the display surface, which areas are suited for particular types of messages or advertisements. For example, a text ad might be displayed as an ad line, in an ad line area 116.

Figure 2:
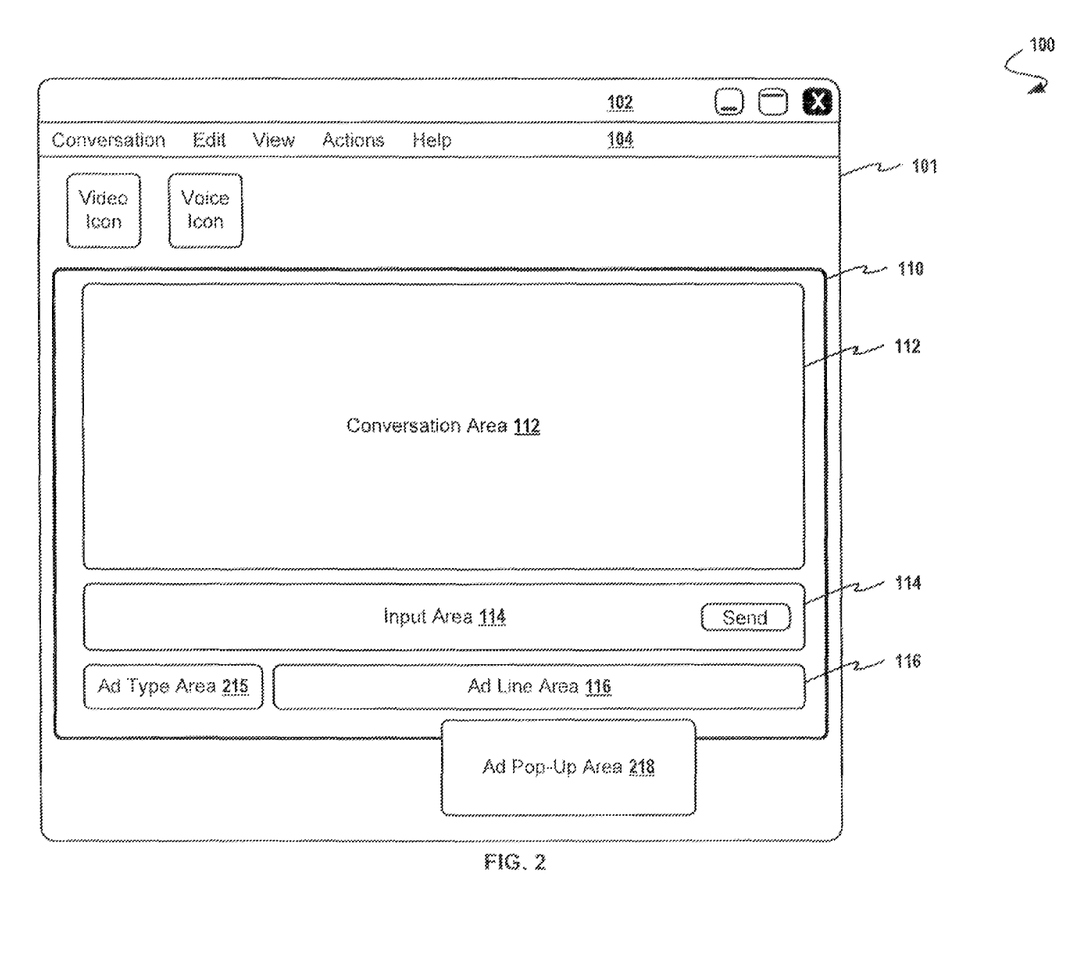
FIG. 2 depicts an instant messaging graphical user interface running on a computing device capable of aggregating contextual targeted advertisements in an instant messaging client, according to one embodiment.

FIG. 2 depicts an instant messaging graphical user interface 100 running on a computing device capable of aggregating contextual targeted advertisements in an instant messaging client. As shown, a text advertisement can be shown on the display surface in an ad line area 116, and the content of such a text advertisement can be determined based on aspects of the context. For example, an advertisement can be determined (at least in part) on the basis of aspects of the context profile. Such an advertisement is termed a contextual advertisement. Such a contextual advertisement might be selected on the basis of keywords present in the user context profile. For example, some embodiments of contextual advertising systems are operable for scanning the text of a website for keywords and for returning text advertisements that correspond. Some techniques for establishing such correspondence are known in the art, however embodiments described herein provide further techniques for selecting from among multiple sources of traditional contextual advertising systems' output, with the addition of text feed data from various static sources, thus enabling the user to see aggregating contextual targeted advertisements in an instant messaging client. For example, a user might be presented with an aggregated ad that combines a first contextual ad (e.g. a targeted ad as earlier described) with a second contextual ad (e.g. which second contextual ad is formed using a feed such as a travel booking link or a shopping link). Such a second contextual ad can be shown on the display surface in an ad pop-up area 218. In some embodiments, such an ad pop-up area 218 can be displayed as a pop-up window displayed on the same display surface as is the instant messaging graphical user interface 100 when the user positions a pointing device (e.g. a mouse) over or near the ad line area 116. In other embodiments, an ad pop-up area 218 can be displayed fully within the instant messaging graphical user interface 100 when the user positions a pointing device (e.g. a mouse) over or near the ad line area 116. In exemplary embodiments, the ad pop-up area can provide additional information related to the content within the ad line area 116.

The context and targeting can be determined based on a wide variety of characteristics of the user or other data items, and such characteristics or data items can be temporally changing at a fast pace (e.g. a set of keywords in the conversation), or such characteristics or data items can be temporally changing at a slower pace (e.g. a User ID). A sample of possible characteristics or data items is shown in Table 1.

TABLE 1

| Possible characteristics or data items | |
|---|---|
| Characteristics of the User or Data Item | Example(s) |
| IP Address | 192.168.1.20 |
| Screen ID | SiteUser12345 |
| Geographic Region | North America, Japan, China |
| Keywords | <keywords selected from the conversation area> |

An instant messaging client can be (or can simulate) any of a variety of instant messaging clients (e.g. chat, iChat, Messenger, AIM, ICQ, aMSN, IM, etc), and can be configured to collect the aforementioned characteristics or data items, and can package or otherwise pre-process the characteristics or data items for further operations (e.g. for sending to an aggregated contextual targeting ad proxy module). Further, such instant messaging clients can be modified in order to be model characteristics of the embodiments described herein.

In particular, an instant messaging client can include an advertisement type area 215, and an ad pop-up area 218 juxtaposed as shown in FIG. 2. In some embodiments, the advertisement type area 215 indicates the type(s) of advertisement. For example, a value of "AD" can indicate that the aggregating contextual targeted advertisements are comprised of a dynamic ad (or dynamic ads), or a value of "FD" can indicate that aggregating contextual targeted advertisements are comprised of feed data from a static feed.

A system for aggregated contextual targeting advertisements using instant messaging clients is now discussed.

Figure 3A:
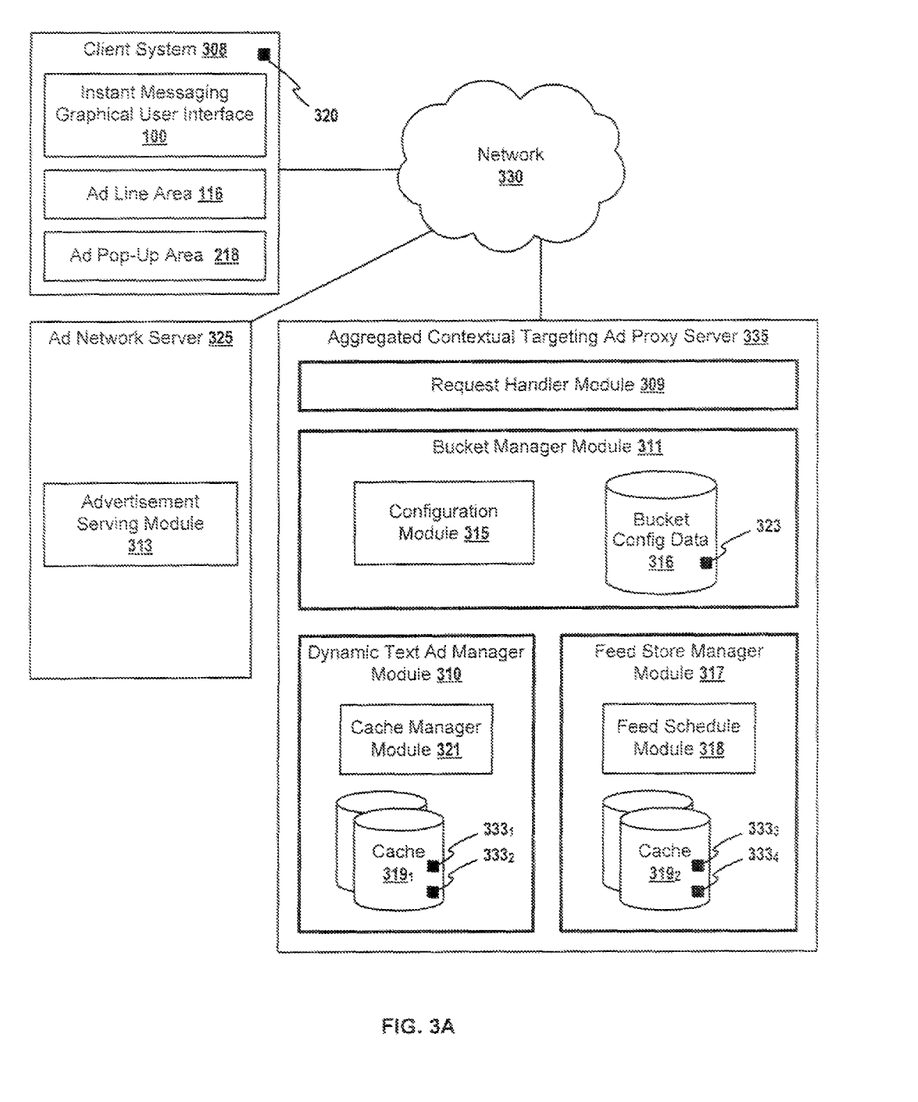
FIG. 3A depicts components of a system for aggregated contextual targeting advertisements using instant messaging clients, according to one embodiment.

FIG. 3A depicts components of a system for aggregated contextual targeting advertisements using instant messaging clients. One component of a system for aggregated contextual targeting advertisements using instant messaging clients is the aggregated contextual targeting ad proxy server 335. As shown, the components include five components configured to operate for the purpose of selecting and aggregating contextual targeting advertisements 333 for display using instant messaging clients. The aggregated contextual targeting ad proxy server 335 can comprise a request handler module 309. In this embodiment, the request handler module receives text ad requests from the client system 308 over network 330. Modules within request handler module 309 serve to collect context information (e.g. one or more instances of a user context profile 320) pertaining to the user or the user's setting (see Table 1) from the client system 308 and store context information for further processing.

As earlier suggested, one or more techniques for selecting from among a plurality of advertisements 333 can include selecting (at least in part) on the basis of aspects of the context can be employed (e.g. on the basis of keywords present in the user context), and the selecting can be performed or facilitated using computer-implemented methods for controlling the selection process. As shown, a bucket manager module 311 can control the selection of aggregated ad distribution. In some embodiments, a system administrator can pre-configure the operation of the system by using a user interface (e.g. configuration module 315) to configure the bucket configuration data 316 for use by any modules comprising the system (e.g. by the aggregated contextual targeting ad proxy server 335). Such bucket configuration data 316 can store information in the form of one or more bucket profiles. A bucket profile 323 contains sufficient information to describe the distribution of ads as are intended to be selected within the constraints of the bucket profile. For example, the following is bucket profile information for exemplary buckets B1 and B2:

B1: 50% SourceS1, 50% SourceS2
B2: 50% SourceS1, 30% SourceS2, 10% SourceS3, 10% SourceS4

The ad sources (e.g. SourceS1, SourceS2, etc) can be characterized or classified into a taxonomy having a plurality of features. Table 2 depicts such a taxonomy specific to the nature of a dynamic source as distinct from a static source.

TABLE 2

Possible bucket taxonomy

| Feature Statement | Dynamic Source | Static Source |
|---|---|---|
| Abstract | SourceS1 | SourceS2 |
| By Geography (e.g. Japan) | JapanSourceS1 | JapanSourceS2 |
| By Geography (e.g. India) | IndiaSourceS1 | IndiaSourceS2 |
| By Geography (e.g. California) | CaliforniaSourceS1 | CaliforniaSourceS2 |
| By Advertiser | Coke News | |
| By Publisher | | Travel Feeds USA |

Thus, a large number of unique buckets can be defined using the technique of defining a bucket profile having percentages of sources. As further examples, the following is bucket profile information for exemplary buckets B3 and B4:
B3: 80% IndiaSourceS1, 20% CaliforniaSourceS2
B4: 20% IndiaSourceS1, 80% CaliforniaSourceS2

So, in operation, an incoming request processed by the request handler module can be assigned to one of the buckets according to the context information. For example, a request originating from a client system located in Bangalore, India and with a certain IP address might be assigned to bucket B3, etc. The bucket profile can uses one or more sources to describe a distribution of ads, namely "dynamic source" ads and "static feed" ads.

For dealing with dynamic sources, a system for aggregated contextual targeting advertisements using instant messaging clients can use a dynamic text ad manager module 310, which module can include a cache 319 (e.g. $319_1$) for caching data (e.g. for caching dynamic ads) and a module for managing the cache, namely a cache manager module 321. The dynamic text ad manager module 310 can manage multiple sources of traditional contextual ads. For example, a text ad that is generated dynamically can be managed by the dynamic text ad manager module 310. The manager can collect the ads from one or more of dynamic ad systems (possibly using a cache 319) and can provide the collected ads via an ad server component (e.g. an ad network server 325) upon demand.

For dealing with static feeds, a system for aggregated contextual targeting advertisements using instant messaging clients can use a feed store manager module 317, which module can include a cache 319 (e.g. $319_2$) for caching data (e.g. for caching static feeds) and a module for managing the cache, namely a feed schedule module 318. The feed store manager module 317 can manage multiple sources of static feeds, and the feed schedule module 318 can pre-fetch static content from multiple systems. Such pre-fetching can be performed periodically, possibly as a background task. Feeds can originate from a wide variety of sources—for example, Yahoo Shopping, Yahoo Trending and Yahoo Travel are three known feed sources—however other feed sources are possible and envisioned. The feed store manager module 317 can contain configuration information needed for pulling feed data from various sources. For example, the feed schedule module 318 can specify a configuration such that the top ten selling items are fetched every twelve hours from Yahoo Shopping, the top five travel locations and ticket booking deals are fetched every two days, etc. The feed store manager module can collect the ads from fetched static content from multiple systems (possibly using cache 319) and can provide the collected ads to an ad server component (e.g. a component within ad network server 325) upon demand.

Ads may be demanded by an ad server, which ad server can operate from any node connected to the network 330. As shown, the ad network server 325 contains an advertisement serving module 313, which is operable to serve out ads to the client system 308. An exemplary flow of the messages and operations involved are described as follows:

1. An aggregated ad request is made from the client system 308 by sending a message to the request handler module 309 (possibly hosted at an aggregated contextual targeting ad proxy server 335).
2. The request handler module 309 collects all the context information from the client, and based on the client context information, the request is assigned to a particular bucket by the bucket manager module 311.
3. When a dynamic source is indicated in the assigned bucket, the dynamic text ad manager module 310 retrieves a dynamic advertisement $333_1$ from cache $319_1$, or will contact a corresponding dynamic data source to retrieve a dynamic advertisement.
4. When a static source is indicated in the assigned bucket, the feed store manager module 317 retrieves the text advertisement $333_3$ content, possibly from the cache $319_2$.
5. The selected aggregated ad (dynamic or static) will then be passed to the requesting server. An advertisement serving module (e.g. an advertisement serving module 313) constructs the three-part aggregated ad for use in the advertisement type area 215, the ad line area 116, and in the ad pop-up area 218, and passes it back to the client system 308 for display.

Figure 3B:
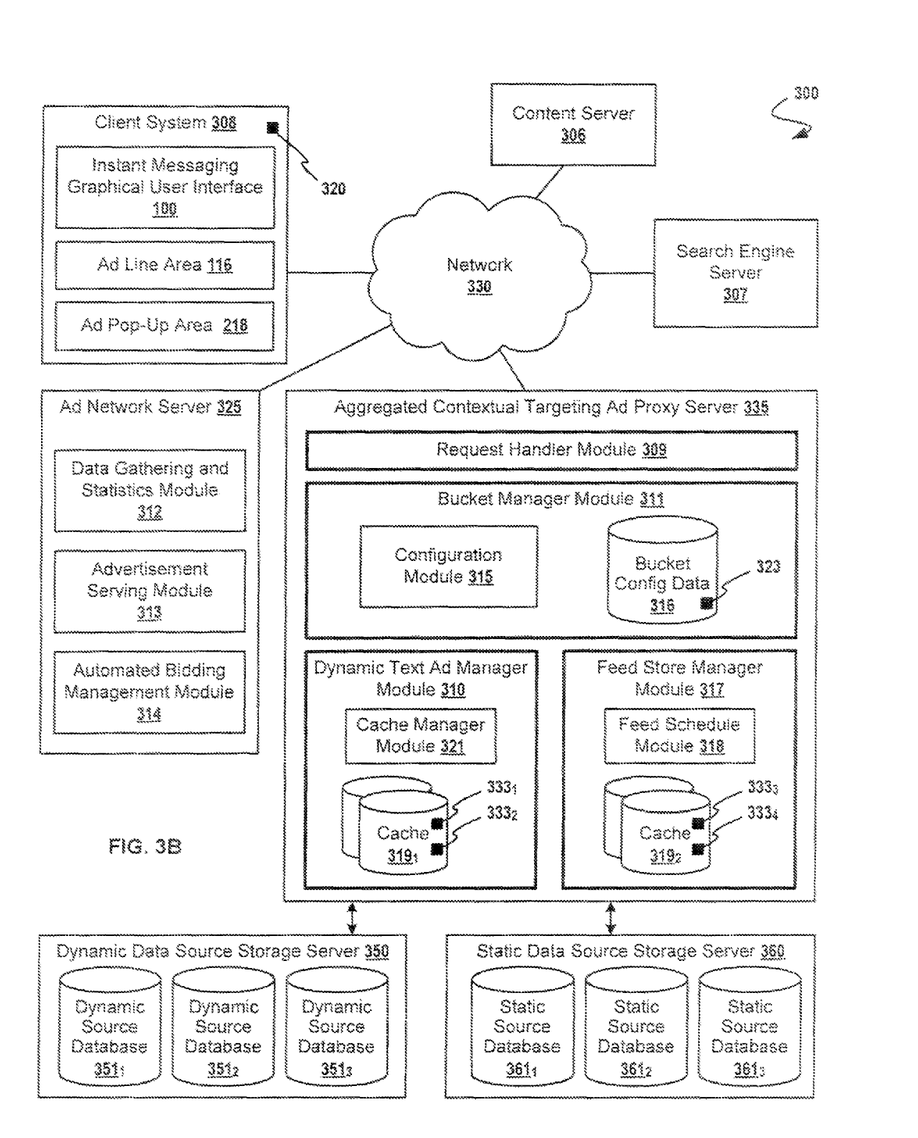
FIG. 3B depicts an advertising server network including components of a system for aggregated contextual targeting advertisements using instant messaging clients, according to one embodiment.

FIG. 3B depicts an advertising server network including components of a system for aggregated contextual targeting advertisements using instant messaging clients. In the context of internet advertising, placement of advertisements within an internet environment using an advertising server network has become common (e.g. using servers within an advertising server network environment 300). An internet advertiser may enter into an advertising campaign including one or more ad relationships (e.g. a delivery contract) such that whenever any internet user satisfying the terms of the delivery contract visits a web page via a client system 308, the advertising system can deem the visit as an opportunity for displaying an ad, and can render the ad on a user screen (e.g. the screen having an instant messaging graphical user interface) as per the terms of the delivery contract. In some cases, the web page may be associated with a particular property, and the user may have traversed to the particular property using a search engine server 307. Continuing, the advertisement is composited on a web page by one or more servers and modules (e.g. an ad network server 325, an advertisement serving module 313, a content server 306, etc) for delivery to a client system 308 over a network 330. Given this generalized delivery model, and using techniques disclosed herein, sophisticated online advertising might be practiced. More particularly, an advertising campaign might include highly-customized advertisements delivered to a user corresponding to highly-specific target predicates, which highly-specific target predicates may correspond to a delivery contract that was booked on the basis of a forecast resulting from a query involving one or more intersecting campaign query predicates.

Again referring to FIG. 3B, an internet property (e.g. a publisher hosting the publisher's base content on a content server 306) might be able to measure the number of visitors that have any arbitrary characteristic, demographic, target predicates, or attributes, possibly using an ad network server 325 in conjunction with a data gathering and statistics module 312. Thus, an internet user might be 'known' in quite some detail as pertains to a wide range of target predicates or other attributes, and such details about the user can be captured in a user context profile 320. Morever, one or more servers of an advertising server network (e.g. servers within an advertising server network environment 300) can scan user text (e.g. instant message content or a web page viewed by a user) for keywords and can return advertisements based on what the user has been viewing.

In addition to the modules, messages and operations described in FIG. 3A, an advertising server network can include further modules for facilitating aggregated contextual targeting advertisements using instant messaging clients. As shown, an advertising server network can include a content server 306 and a search engine server 307. In operation, a content server 306 can produce content including advertising content, which content in turn is stored for retrieval in one or more databases. For example, content including advertising content can be stored in a dynamic source database 351, or in a static source database 361. Such databases (such as a dynamic source database 351 or a static source database 361) can be managed by a dynamic data source storage server 350 or a static data source storage server 360. In some embodiments, the dynamic data source storage server 350 or the static data source storage server 360 can be connected to a network 330 by a network interface (not shown), and can communicate to any node on network 330.

Now, observing that a window 101 of an instant messaging client can include both an ad line area 116 as well as an ad pop-up area 218 gives rise to the opportunity to practice aggregated contextual targeting advertisements within a window or display surface of an instant messaging client. In one embodiment, advertisements are aggregated by displaying a first portion of a targeted advertisement in the ad line area 116, and a second portion of the targeted advertisement in the ad pop-up area 218.

Various embodiments provide for selection of the aforementioned first portion and second portion. Table 3 shows some possibilities for separating an advertisement into two portions where the second portion has a relationship to the first portion.

TABLE 3

Possible relationships between a first portion and a second portion

| Advertiser | First Portion | Second Portion |
| --- | --- | --- |
| UoP | Text: "University of Phoenix" | Pop-Up: UoP MBA at <link> |
| Pepsi | Text: "The Pepsi Generation" | Pop-Up: Paid Pepsi Survey at <link> |
| BMW | Text: "BMW Winner's Circle" | Pop-Up: See F1 standings at <BMW-link> |
| MLB | Text: "MLB:Cubs WIN" | Pop-Up: Sosa Stats at <MLB-link> |
| Coca-Cola | Text: <text from Coke News> | Pop-Up: <Coupon from Coke News> |
| AdvertiserX | Text: <any AdvertiserX text> | Pop-Up: <any AdvertiserX material> |

Of course, the examples shown in Table 3 are purely exemplary, and many other possibilities exist. In fact many other relationships beyond those shown in Table 3 do exist between a first portion and a second portion. Moreover, the processing associated with separating an advertisement into a first portion and a second portion can include separating based on an advertiser specification (i.e. as is exemplified in Table 3). Or, the processing associated with separating an advertisement into a first portion and a second portion can include separating based on considerations independent from any advertiser specification. For example, separating an advertisement into a first portion and a second portion can include automatically selecting a string of text (e.g. a sentence) for display in an ad line area 116, and automatically selecting an image (e.g. a coupon) for display in an ad pop-up area 218. Processing for separating an advertisement into a first portion and a second portion can be performed in a configuration module 315, or in an advertisement serving module 313, or in any server for that matter.

The modules, network connections, algorithms, assignment techniques, serving policies, and data structures embodied within the advertising server network environment 300 might be specialized so as to perform a particular function or group of functions reliably while observing capacity and performance requirements. Moreover, some processing can reasonably be performed in batch mode or "off-line", while other processing can be performed interactively or "live".

Figure 4:
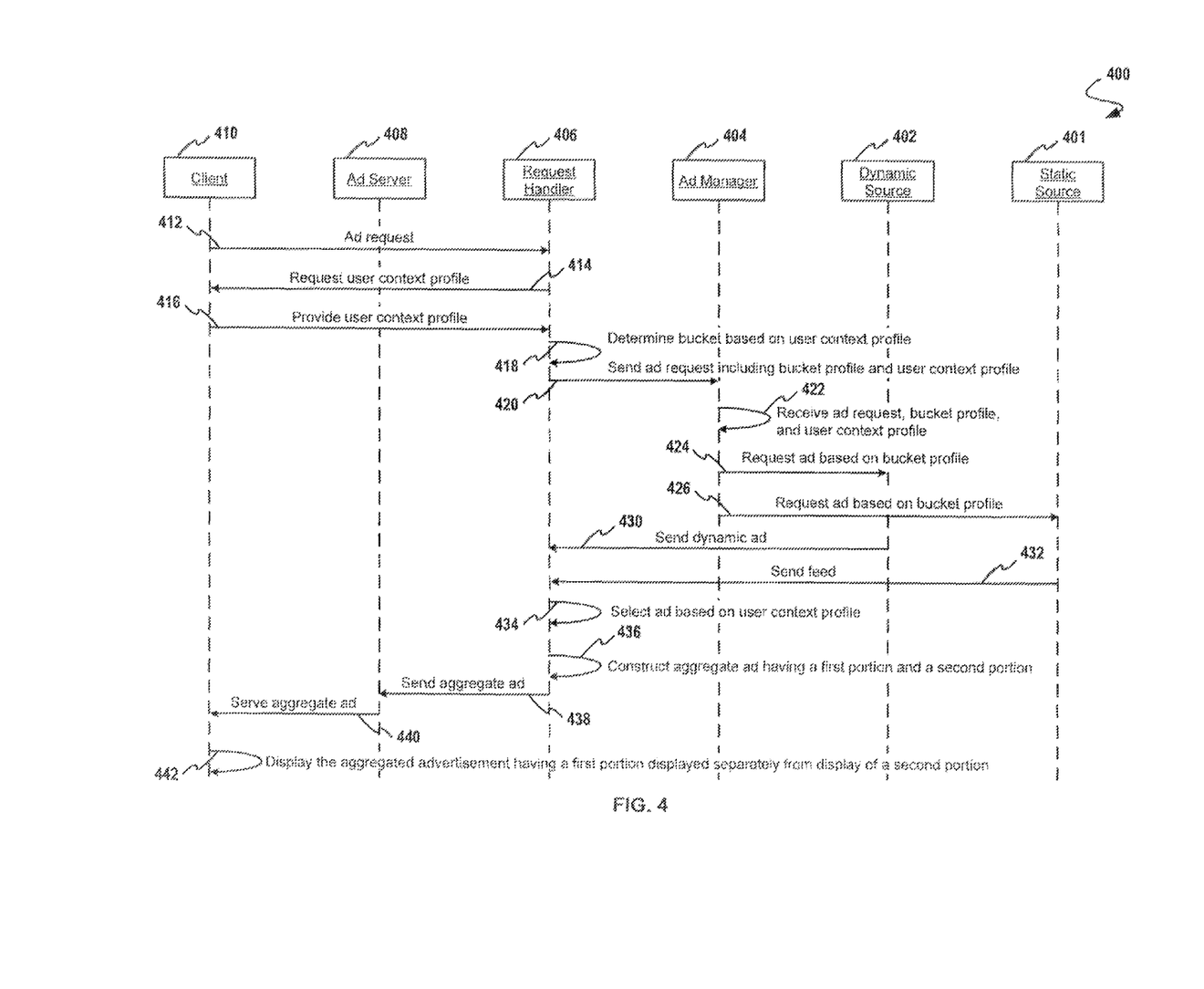
FIG. 4 depicts a protocol for messages and operations carried out in an advertising server network for displaying to a user an aggregated contextual targeting advertisement using an instant messaging client, according to one embodiment.

FIG. 4 depicts a protocol for messages and operations carried out in an advertising server network for displaying targeting advertisements using an instant messaging client, according to one embodiment. As shown, the protocol 400 implements a computer-implemented method for displaying to a user an aggregated contextual targeting advertisement using an instant messaging client.

The protocol messages and operations are exchanged or performed respectively between a static source repository 401, a dynamic source repository 402, an ad manager 404, a request handler 406, an ad server 408, and a client 410. In one embodiment, a client 410 sends an ad request to a request handler (see message 412). The request handler can then request a user context profile (see message 414), which request deserves a response in the form of a user context profile (see message 416). The request handler 406, being configured for receiving a user context profile (the user context profile having at least one characteristic of the user) can proceed to determine the bucket based on some aspect of the user context profile (see operation 418). Then, based on some aspect of the bucket profile, the request handler 406 can send an ad request to an ad manager (see message 420). The ad manager in turn can receive and process the ad request, bucket profile, and user context profile (see operation 422) in order to perform further requests to a dynamic source (see message 424) or to a static source (see message 426) or both (as shown). The dynamic source or the static source or both (as shown) can reply with one or more advertisements that match to the ad request, and/or bucket profile, and/or user context profile (see message 430 and message 432). The request handler, when configured to do so, can then process the ads, selecting at least one advertisement, the at least one advertisement based at least in part on the at least one characteristic of the user (see operation 434). Of course, in other embodiments, a module other than the request handler 406 can process the ads, selecting at least one advertisement.

As shown, the request handler serves for separating the at least one advertisement into a first portion and a second portion, and constructing an aggregate advertisement (see operation 436). The aggregate advertisement is then sent to an ad server (see message 438) and then served to the client (see message 440) for displaying to a user an aggregated contextual targeting advertisement using an instant messaging client (see operation 442). The client 410 is capable of displaying the first portion in an ad line area within an instant messaging graphical user interface and is further capable of displaying the second portion in an ad pop-up area (the ad pop-up area being on the same display surface as the instant messaging graphical user interface).

Returning to the description of several messages and operations:

The message 416 to provide the user context profile can send one or more characteristics of the user such as keywords, an IP address, and/or a user demographic, and the successive operations for selecting (e.g. see operation 434) can include selecting on the basis of the keywords, an IP address, and/or a user demographic. Moreover the successive operations for selecting (e.g. see operation 434) can include on the contents of a bucket profile.

Any operations for separating an advertisement into a first portion and a second portion (e.g. see operation 436) can be based on an advertiser specification, or can be based on techniques for automatically selecting a string of text from the advertisement, or by automatically selecting an image from the advertisement.

Many alternative embodiments can be practiced using the protocol 400, and the order of appearance of numbering of the messages and operations is not to be construed as limiting. Neither is the selection of names of the actors (i.e. static source repository 401, dynamic source repository 402, ad manager 404, request handler 406, ad server 408, client 410) to be construed as limiting.

Figure 5:
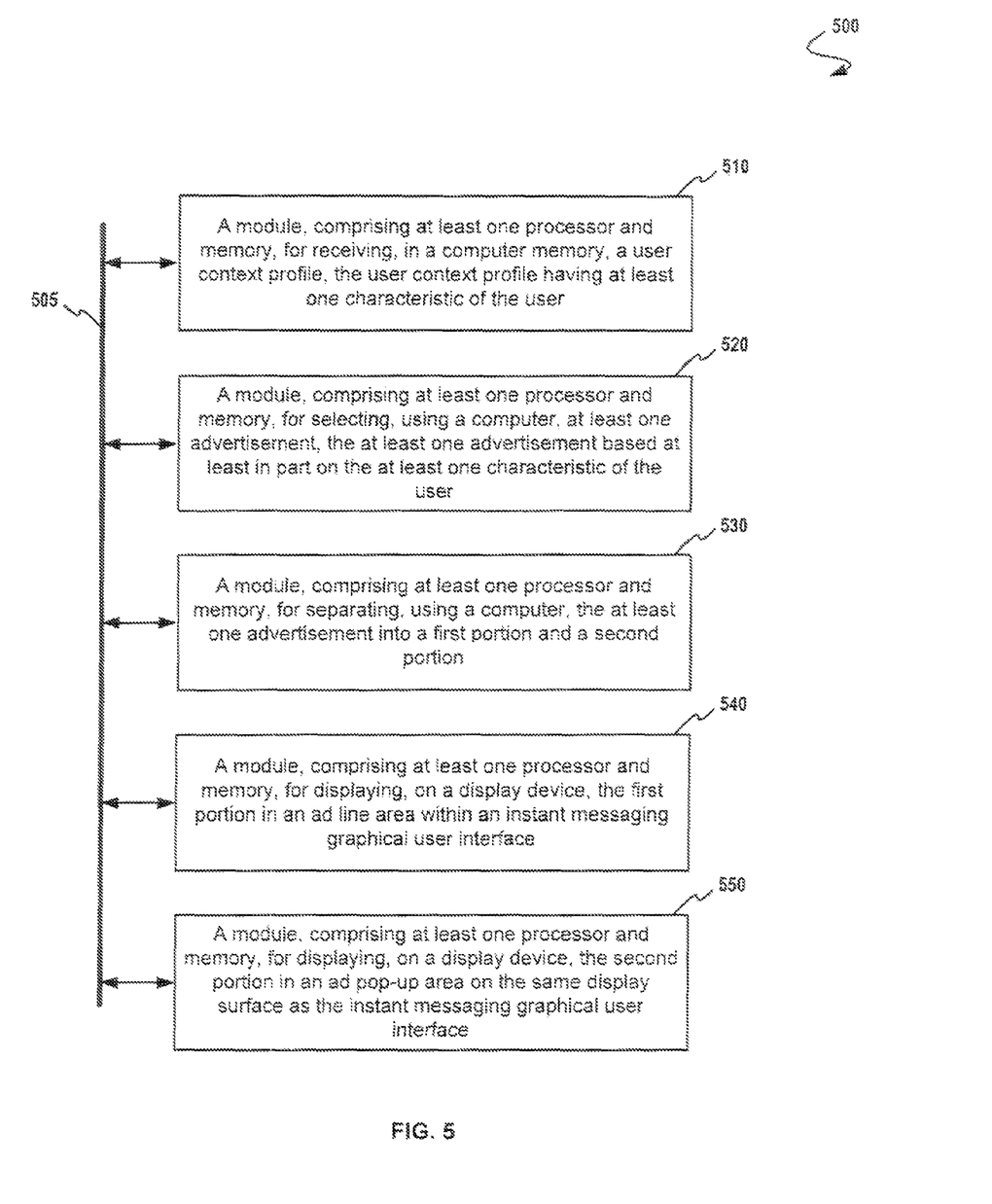
FIG. 5 depicts a block diagram of a system for displaying to a user an aggregated contextual targeting advertisement using an instant messaging client, according to one embodiment.

FIG. 5 depicts a block diagram of a system for displaying to a user an aggregated contextual targeting advertisement using an instant messaging client. As an option, the present system 500 may be implemented in the context of the architecture and functionality of the embodiments described herein. Of course, however, the system 500 or any operation therein may be carried out in any desired environment. As shown, system 500 comprises a plurality of modules, a module comprising at least one processor and a memory, each connected to a communication link 505, and any module can communicate with other modules over communication link 505. The modules of the system can, individually or in combination, perform method steps within system 500. Any method steps performed within system 500 may be performed in any order unless as may be specified in the claims. As shown, system 500 implements a method for displaying to a user an aggregated contextual targeting advertisement using an instant messaging client, the system 500 comprising modules for: receiving a user context profile, the user context profile having at least one characteristic of the user (see module 510); selecting at least one advertisement, the at least one advertisement based at least in part on the at least one characteristic of the user (see module 520); separating the at least one advertisement into a first portion and a second portion (see module 530); displaying the first portion in an ad line area within an instant messaging graphical user interface (see module 540); and displaying the second portion in an ad pop-up area on the same display surface as the instant messaging graphical user interface (see module 550).

Figure 6:
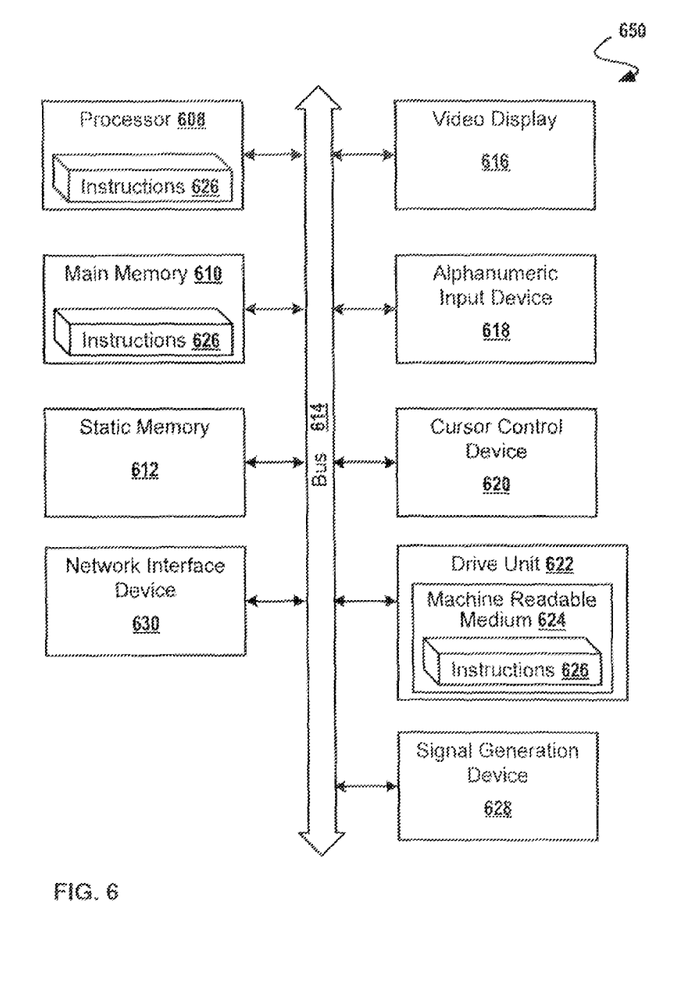
FIG. 6 is a diagrammatic representation of a network including nodes for client computer systems, nodes for server computer systems, and nodes for network infrastructure, according to some embodiments.

FIG. 6 is a diagrammatic representation of a network 600, including nodes for client computer systems $602_1$ through $602_N$, nodes for server computer systems $604_1$ through $604_N$, and network infrastructure nodes $606_1$ through $606_N$, according to some embodiments. The embodiment shown is purely exemplary, and might be implemented in the context of one or more of the figures herein.

Any node of the network 600 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 650 includes a processor 608 (e.g. a processor core, a microprocessor, a computing device, etc), a main memory 610 and a static memory 612, which communicate with each other via a bus 614. The machine 650 may further include a display unit 616 that may comprise a touch-screen, or a liquid crystal display (LCD), or a light emitting diode (LED) display, or a cathode ray tube (CRT). As shown, the computer system 650 also includes a human input/output (I/O) device 618 (e.g. a keyboard, an alphanumeric keypad, etc), a pointing device 620 (e.g. a mouse, a touch screen, etc), a drive unit 622 (e.g. a disk drive unit, a CD/DVD drive, a tangible computer readable removable media drive, an SSD storage device, etc), a signal generation device 628 (e.g. a speaker, an audio output, etc), and a network interface device 630 (e.g. an Ethernet interface, a wired network interface, a wireless network interface, a propagated signal interface, etc).

The drive unit 622 includes a machine-readable medium 624 on which is stored a set of instructions (i.e. software, firmware, middleware, etc) 626 embodying any one, or all, of the methodologies described above. The set of instructions 626 is also shown to reside, completely or at least partially, within the main memory 610 and/or within the processor 608. The set of instructions 626 may further be transmitted or received via the network interface device 630 over the network bus 614.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for displaying to a user an aggregated contextual targeting advertisement using an instant messaging client, comprising:
    receiving, in a computer, a user context profile, the user context profile having at least one characteristic of the user;
    selecting, using a computer, at least one advertisement, the at least one advertisement based in part on the at least one characteristic of the user and comprising a link to a target page;
    separating, using a computer, the advertisement into a first portion and a second portion such that the first portion comprises an ad line that describes subject matter of the advertisement and the second portion comprises content that provides additional details of the advertisement;
    displaying, on a display device, the first portion within an instant messaging graphical user interface;
    identifying, using a computer, a first user input gesture directed at the first portion;
    displaying, on a display device, the second portion within the instant messaging client in response to the identified first user input gesture;
    identifying, using a computer, a second user input gesture directed at the second portion; and
    displaying, on a display device, the target page in response to the identified second user input gesture, wherein the target page is rendered in a window or portion of the display device that is separate from the instant messaging client.

2. The method of claim 1, wherein the characteristic of the user includes at least one of an Internet Protocol (IP) address and a user demographic.

3. The method of claim 2, wherein the characteristic includes a user demographic and the selecting includes selecting on the basis of the user demographic.

4. The method of claim 1, wherein the selecting includes selecting on the basis of keywords present in the instant messaging client.

5. The method of claim 1, wherein the selecting includes selecting on the basis of a bucket profile.

6. The method of claim 1, wherein the separating comprises separating based on an advertiser specification.

7. The method of claim 1, wherein the separating comprises at least one of automatically selecting a string of text, or automatically selecting an image.

8. An advertising server network for displaying to a user an aggregated contextual targeting advertisement using an instant messaging client, comprising:
    a module comprising a processor and memory, for receiving a user context profile, the user context profile having at least one characteristic of the user;
    a module for selecting at least one advertisement, the advertisement based in part on the characteristic of the user and comprising a link to a target page;
    a module for separating the advertisement into a first portion and a second portion such that the first portion comprises an ad line that describes subject matter of the advertisement and the second portion comprises content that provides additional details of the advertisement;
    a module for displaying the first portion within an instant messaging graphical user interface;
    a module for identifying a first user input gesture directed at the first portion;
    a module for displaying, on a display device, the second portion within the instant messaging client in response to the identified first user input gesture;
    identifying, using a computer, a second user input gesture directed at the second portion; and
    displaying, on a display device, the target page in response to the identified second user input gesture, wherein the target page is rendered in a window or portion of the display device that is separate from the instant messaging client.

9. The advertising server network of claim 8, wherein the characteristic of the user includes at least one of an IP address and a user demographic.

10. The advertising server network of claim 8, wherein the characteristic includes a user demographic and the selecting includes selecting on the basis of the user demographic.

11. The advertising server network of claim 8, wherein the selecting includes selecting on the basis of keywords present in the instant messaging client.

12. The advertising server network of claim 8, wherein the selecting includes selecting on the basis of a bucket profile.

13. The advertising server network of claim 8, wherein the separating comprises separating based on an advertiser specification.

14. The advertising server network of claim 8, wherein the separating comprises at least one of automatically selecting a string of text, or automatically selecting an image.

15. A non-transitory computer readable medium comprising a set of instructions which, when executed by a computer, cause the computer to display to a user an aggregated contextual targeting advertisement using an instant messaging client, the set of instructions for:
    receiving a user context profile, the user context profile having at least one characteristic of the user;
    selecting at least one advertisement, the at least one advertisement based in part on the at least one characteristic of the user and comprising a link to a target page;
    separating the advertisement into a first portion and a second portion such that the first portion comprises an ad line that describes subject matter of the advertisement and the second portion comprises content that provides additional details of the advertisement;
    displaying the first portion within an instant messaging graphical user interface;
    identifying, using a computer, a first user input gesture directed at the first portion;
    displaying, on a display device, the second portion within the instant messaging client in response to the identified first user input gesture;
    identifying, using a computer, a second user input gesture directed at the second portion; and
    displaying, on a display device, the target page in response to the identified second user input gesture, wherein the target page is rendered in a window or portion of the display device that is separate from the instant messaging client.

16. The non-transitory computer readable medium of claim 15, wherein the characteristic of the user includes at least one of an IP address and a user demographic.

17. The non-transitory computer readable medium of claim 15, wherein the characteristic includes a user demographic and the selecting includes selecting on the basis of the user demographic.

18. The non-transitory computer readable medium of claim 15, wherein the selecting includes selecting on the basis of keywords present in the instant messaging client.

19. The non-transitory computer readable medium of claim 15, wherein the selecting includes selecting on the basis of a bucket profile.

20. The non-transitory computer readable medium of claim 15, wherein the separating comprises at least one of automatically selecting a string of text, or automatically selecting an image.

* * * * *